United States Patent
Di Pietro et al.

(10) Patent No.: US 9,635,050 B2
(45) Date of Patent: Apr. 25, 2017

(54) DISTRIBUTED SUPERVISED ARCHITECTURE FOR TRAFFIC SEGREGATION UNDER ATTACK

(71) Applicant: Cisco Technology, Inc., San Jose, CA (US)

(72) Inventors: Andrea Di Pietro, Lausanne (CH); Jean-Philippe Vasseur, Saint Martin d'Uriage (FR); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 93 days.

(21) Appl. No.: 14/338,526

(22) Filed: Jul. 23, 2014

(65) Prior Publication Data

US 2016/0028762 A1     Jan. 28, 2016

(51) Int. Cl.
*H04L 29/06*  (2006.01)
*G06F 21/55*  (2013.01)
*G06N 99/00*  (2010.01)

(52) U.S. Cl.
CPC .......... *H04L 63/1458* (2013.01); *G06F 21/55* (2013.01); *G06N 99/005* (2013.01); *H04L 63/02* (2013.01); *H04L 63/0227* (2013.01); *H04L 63/1416* (2013.01)

(58) Field of Classification Search
CPC .............................. H04L 63/1458; G06F 21/55
See application file for complete search history.

(56) References Cited

U.S. PATENT DOCUMENTS

| | | | |
|---|---|---|---|
| 7,792,770 B1 | 9/2010 | Phoha et al. | |
| 7,849,124 B2 * | 12/2010 | Ide | G05B 23/024 708/422 |
| 8,479,057 B2 | 7/2013 | Poletto et al. | |
| 8,544,087 B1 * | 9/2013 | Eskin | G06F 21/552 726/22 |
| 8,626,678 B2 | 1/2014 | Baltatu et al. | |
| 2006/0225133 A1 * | 10/2006 | Balasubramaniyan | H04L 63/1458 726/22 |
| 2007/0280114 A1 * | 12/2007 | Chao | H04L 43/0888 370/235.1 |
| 2007/0289013 A1 * | 12/2007 | Lim | G06F 21/552 726/22 |
| 2010/0153316 A1 * | 6/2010 | Duffield | G06F 21/552 706/12 |
| 2011/0267964 A1 * | 11/2011 | Baltatu | H04L 12/2602 370/242 |

(Continued)

*Primary Examiner* — Jason C Chiang
(74) *Attorney, Agent, or Firm* — Parker Ibrahim & Berg LLC; James M. Behmke; Stephen D. LeBarron

(57) ABSTRACT

In one embodiment, data flows are received in a network, and information relating to the received data flows is provided to a machine learning attack detector. Then, in response to receiving an attack detection indication from the machine teaming attack detector, a traffic segregation procedure is performed including: computing an anomaly score for each of the received data flows based on a degree of divergence from an expected traffic model, determining a subset of the received data flows that have an anomaly score that is lower than or equal to an anomaly threshold value, and providing information relating to the subset of the received data flows to the machine learning attack detector.

21 Claims, 9 Drawing Sheets

(56) References Cited

U.S. PATENT DOCUMENTS

| | | | |
|---|---|---|---|
| 2012/0240185 A1* | 9/2012 | Kapoor | H04L 63/1425 726/1 |
| 2013/0198119 A1* | 8/2013 | Eberhardt, III | G06N 7/005 706/12 |
| 2014/0325649 A1* | 10/2014 | Zhang | H04L 43/024 726/23 |

* cited by examiner

DISTRIBUTED SUPERVISED ARCHITECTURE FOR TRAFFIC SEGREGATION UNDER ATTACK

TECHNICAL FIELD

The present disclosure relates generally to computer networks, and, more particularly, to a distributed supervised architecture for traffic segregation under attack.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of a computer network is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. The detection of DoS attacks is particularly challenging when network resources are limited, such as in the case of a low power and lossy network (LLN).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
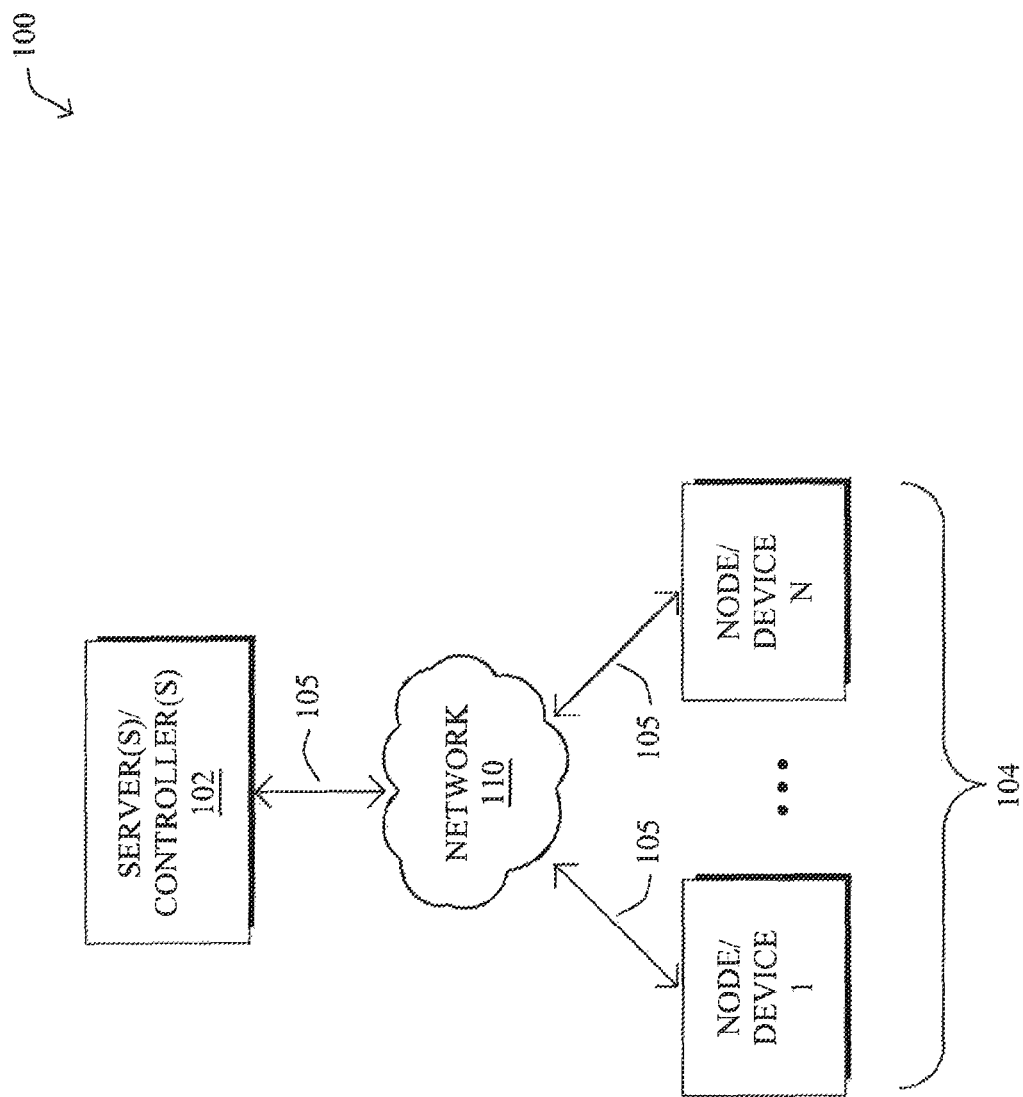
FIG. 1 illustrates an example communication network.

According to one or more embodiments of the disclosure, data flows are received in a network, and information relating to the received data flows is provided to a machine learning attack detector. Then, in response to receiving an attack detection indication from the machine learning attack detector, a traffic segregation procedure is performed including: computing an anomaly score for each of the received data flows based on a degree of divergence from an expected traffic model, determining a subset of the received data flows that have an anomaly score that is lower than or equal to an anomaly threshold value, and providing information relating to the subset of the received data flows to the machine learning attack detector.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer system 100 illustratively comprising one or more server(s)/controller(s) 102 and one or more nodes/devices 104 (e.g., a first through nth node/device) that are interconnected by various methods of communication. For example, links 105 may be wired links or shared media (e.g., wireless links, PLC links, etc.) that illustratively form a network 110. Those skilled in the art will understand that any number of nodes, devices, links, etc. may be used in computer system 100, and that the view shown herein is for simplicity. Also, those skilled in the art will further understand that while the network is shown in a certain orientation, system 100 is merely an example illustration that is not meant to limit the disclosure.

In general, server(s)/controller(s) 102 provide some form of control over nodes/devices 104 and, more generally, over the operation of network 110. For example, servers/controllers 102 may include, but are not limited to, path computation engines (PCEs), network controllers, network management systems (NMSs), policy engines, reporting mechanisms, or any other form of device or system that provides some degree of global or localized control over other devices in the network.

Nodes/devices 104 may include any form of networking device used to generate, forward, receive, etc., traffic within network 110. For example, nodes/device 104 may include, but are not limited to, routers, switches, computers, or the like.

Data packets (e.g., traffic and/or messages sent between the devices/nodes) may be exchanged among the nodes/devices of the computer system 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

In some embodiments, network 110 may be or may include a WAN, LAN, service provider network, customer edge network, multi-protocol label switched (MPLS) network, IP network, wireless network, mesh network, shared media network, virtual private network (VPN), or any other form of computing network. In one embodiment, network 110 may be, or may include, a Low Power and Lossy Network (LLN). LLNs (e.g., certain sensor networks), may be used in a myriad of applications, such as for "Smart Grid" and "Smart Cities," A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnections are constrained: LLN routers typically operate with constraints, e.g., processing power, memory, and/or energy (battery), and their interconnections are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 2:
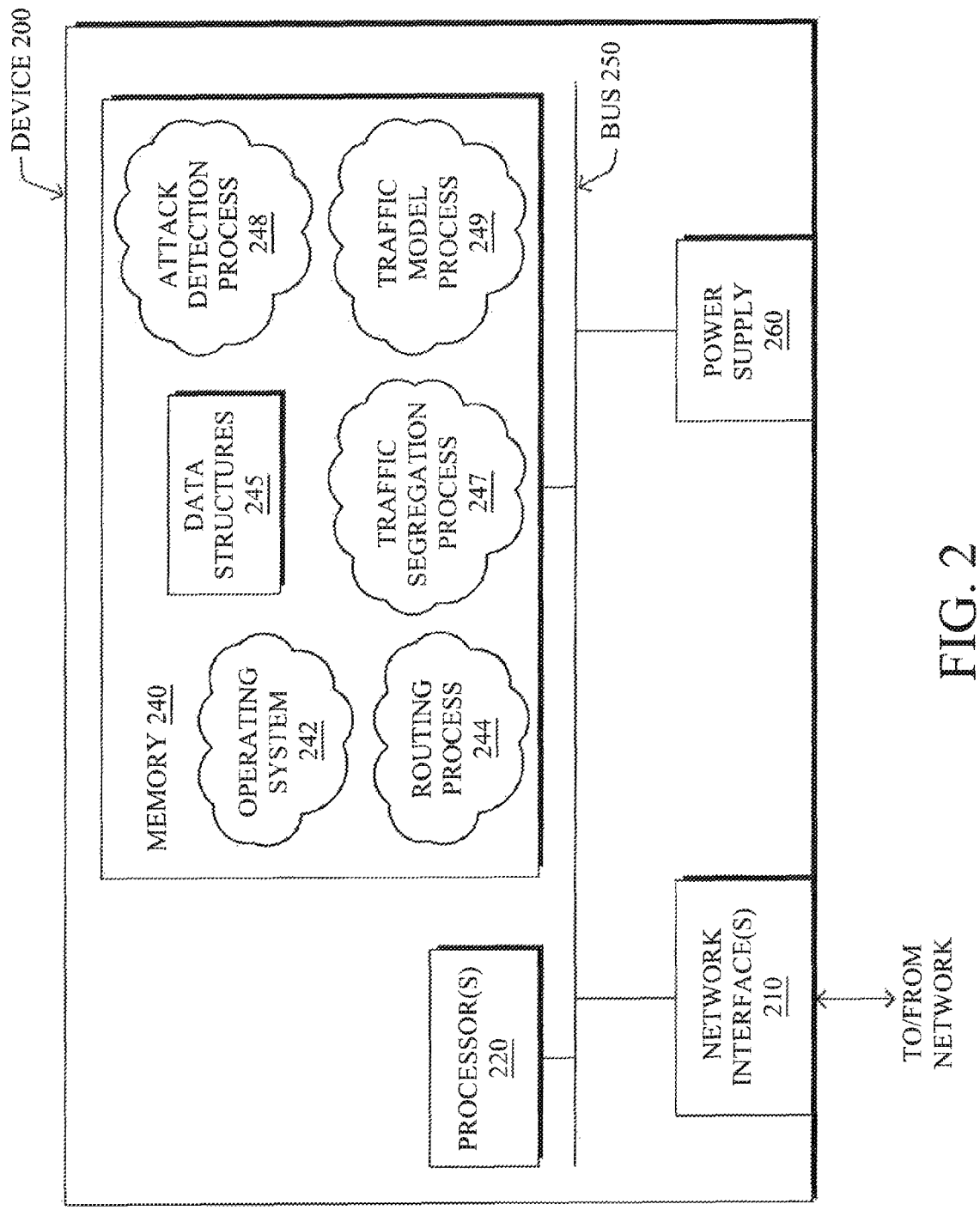
FIG. 2 illustrates an example network device/node.

FIG. 2 is a schematic block diagram of an example node/device 200 (e.g., a server/controller 102, a node/device 104, etc.) that may be used with one or more embodiments described herein, e.g., as any of the devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a traffic segregation process 247, an attack detection process 248, and/or a traffic model process 249, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Attack detection process 248 includes computer executable instructions executed by the processor 220 to perform various functions, such as attack detection and reporting. In various embodiments, attack detection process 248 may use machine learning to determine whether an attack and/or a specific type of attack is detected. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data. Accordingly, attack detection process 248 may be an attack detection classifier that classifies network traffic or conditions into either an "attack" category or a "normal operation" category, based on learned behavior of the network. In some implementations, attack detection process 248 may also be configured to use additional categories (e.g., classification labels), such as labels indicative of specific types of attacks.

As also noted above, learning machines (LMs) are computational entities that rely on one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.). In some cases, ANN classifiers may be hierarchical in that a more powerful classifier verifies a conclusion reached by a lower-powered classifier. Other machine learning techniques that may be used in an attack detection classifier may include, but are not limited to, support vector machines (SVMs), naïve Bayesian models, decision trees, and the like.

Attack detection process 248 may also employ anomaly detection techniques, to classify network conditions as being indicative of an attack. Anomaly Detection (AD) is a data mining and machine learning technique that entails detecting, from a flow of data, the elements of the flow that do not follow the same pattern as the other flow elements. In particular, AD techniques may be used to construct a model of normal behavior and may use the model to detect data points that are unlikely to fit the model. Example AD techniques include, but are not limited to, k-NN techniques, one-class SVM techniques, replicator NN techniques, etc. Notably, such techniques may be used by learning machine process 248 to detect previously unseen forms of attacks.

In further embodiments, attack detection process 248 may use clustering techniques, to detect a potential network attack. Clustering denotes a family of techniques in which the objective is to group objects according to some (usually predefined) notion of similarity. For instance, clustering is a very popular technique used in recommender systems (RS) for grouping objects that are similar in terms of people's tastes. This way, the system can propose new products that the user will like with a high probability, based on previous choices of this particular user. Typical clustering algorithms are k-means, DBSCAN or Mean-Shift, among others.

Traffic segregation process 247, as described in greater detail below, includes computer executable instructions executed by the processor 220 to perform functions that include iteratively segregating attack traffic from normal traffic in a computer network, such as network 100.

Traffic model process 249, also as described in greater detail below, includes computer executable instructions executed by the processor 220 to perform functions that include allowing an anomaly score to be calculated for data flows based on a degree of divergence from the generated expected traffic model. Both the traffic segregation process 247 and traffic model process 249 may operate in conjunction with the attack detection process 248.

Figure 3A:
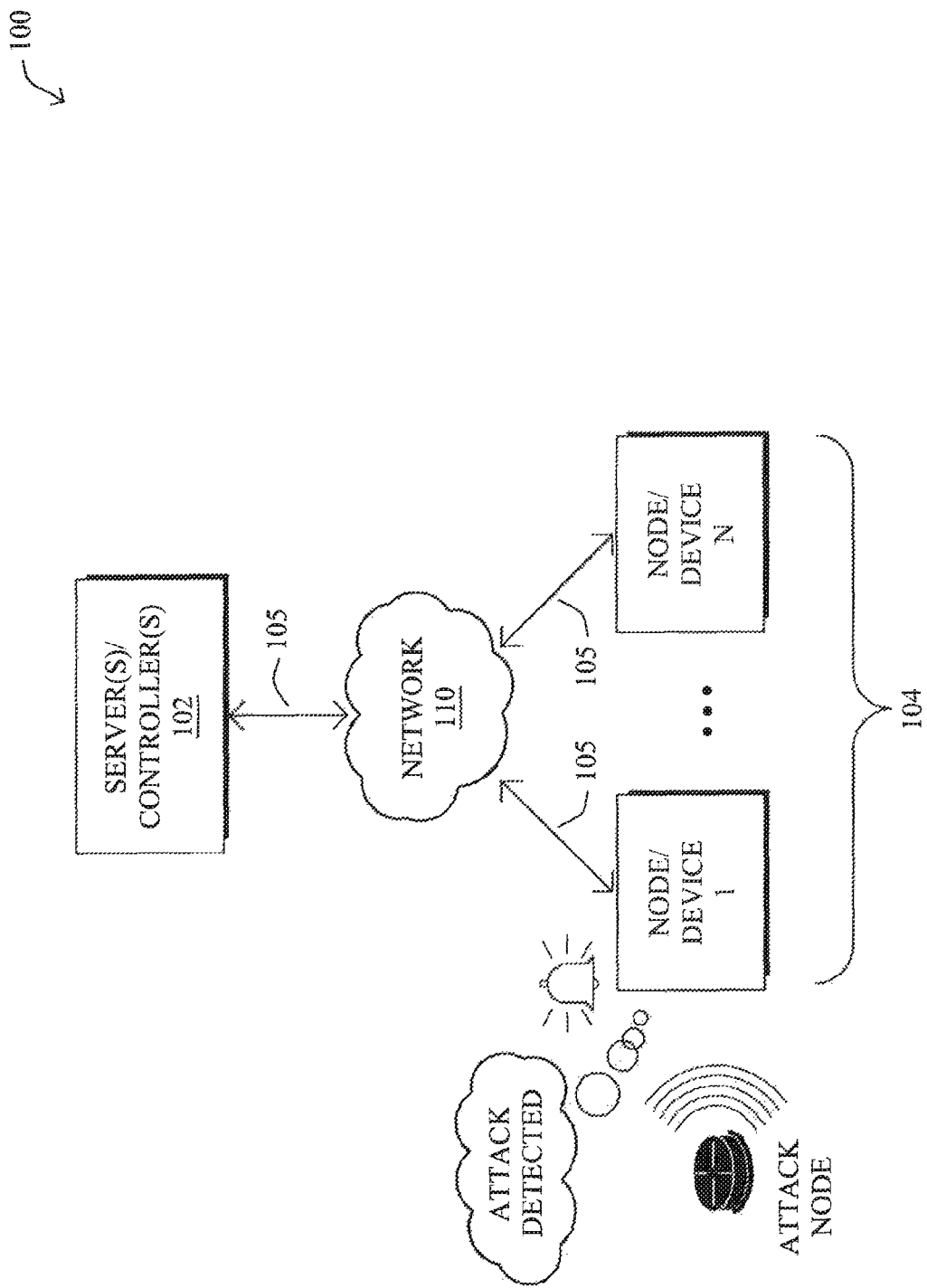
FIGS. 3A-3B illustrate an example of a network attack being detected.
Figure 3B:
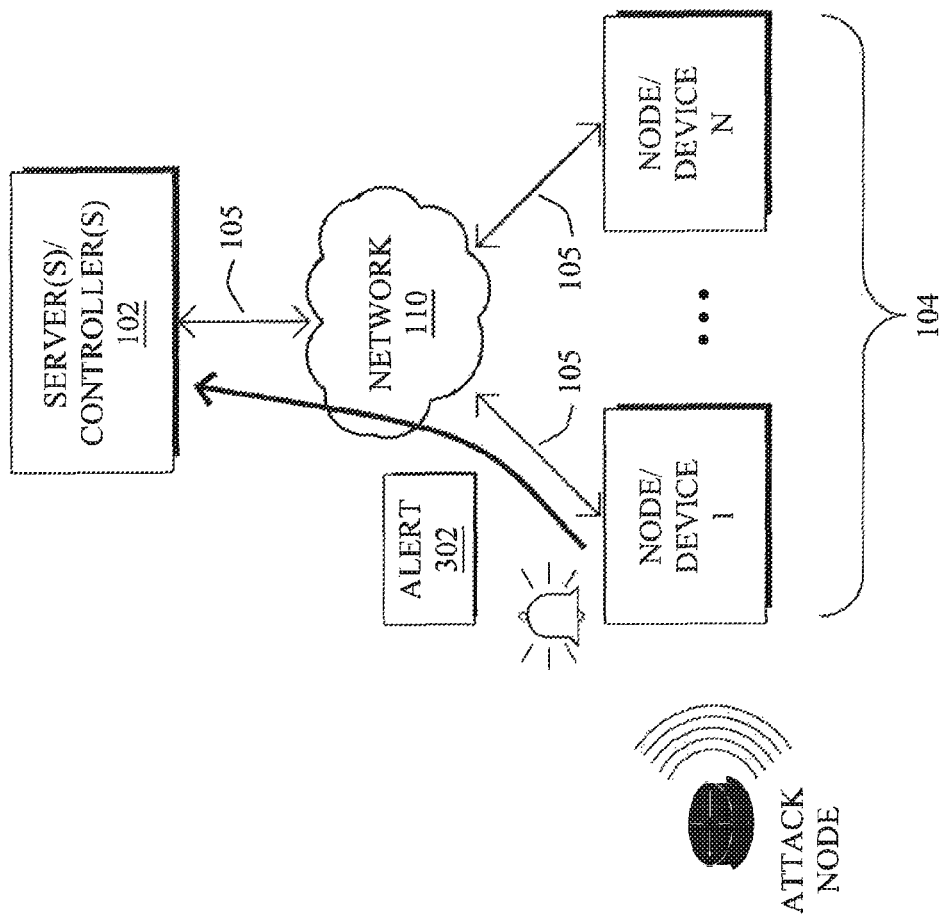

FIGS. 3A-3B illustrate an example of a network attack being detected, according to various embodiments. As shown, assume that a particular node/device 104 is under attack from an attack node. During a DoS attack, for example, the attack node may attempt to flood the node/device with request traffic (e.g., SYN flooding), thereby reducing the amount of resources available at the device/node (and potentially the network itself) for legitimate traffic. Notably, other forms of DoS attacks may attempt to send a high volume of traffic (e.g., a volume based DoS attack) and may, in some cases, be distributed DoS (DDoS) attacks.

As shown in FIG. 3A, assume that the particular node/device 104 under attack is configured to execute an attack detector process (e.g., process 248). In general, the attack detector process may be operable to observe traffic behavior and apply a label (e.g., a classification) to the observed traffic behavior. For example, the node/device 104 under attack may determine that a sharp increase in request traffic is indicative of an attack (e.g., the observed behavior may be labeled as an attack by the device's machine learning process). In such a case, as shown in FIG. 3B, the node/device 104 may initiate countermeasures, such as sending an alert 302 to one of the servers/controller 102 (e.g., to alert a network administrator), etc.

As referenced above, denial of service is a broad term for any kind of attack aiming, by any means, at making a particular service unavailable (be it a certain application running on a server or network connectivity itself). This is usually performed by bringing the target's resources to exhaustion (target resources may range from bandwidth to memory and CPU). In greater detail, a denial-of-service attack may consist of flooding a target network with hundreds of megabits of traffic (e.g., a volume-based DoS), exhausting a server state by opening a number of TCP connections (e.g., SYN flooding), or by making an HTTP server unavailable by sending it an overwhelming number of requests. An attack may be subtle and exploit well-known vulnerabilities in the target system (e.g., a large number of fragmented IP packets may exhaust the resources of a router), thus leading to attacks that are difficult to detect and mitigate.

Nowadays, denials of service attacks are mostly distributed (DDoS), meaning they are carried out by multiple sources at the same time, making it more difficult to track. In many cases botnets (i.e., armies or infected hosts spread across the network and under the control of a single master) are used for mounting DoS attacks. In addition, source addresses used for attacks can be spoofed, so that blocking an offending address is potentially useless.

DoS attacks can be easy to detect when they are brute-force (e.g., volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. As a result, machine learning techniques are particularly beneficial for learning the behavior of these attacks for detecting them before a server or an entire network becomes unavailable.

Once a DoS attack has been detected, mitigation is largely carried out by hand, e.g., either the network administrator manually blocks what traffic seems to be malicious, or border gateway protocol (BGP) is used for redirecting traffic to a data center, where it is typically analyzed by human experts and segregation will be carried out (known as traffic scrubbing). Other methods challenge suspicious flows in order to check that they are not generated by bots (e.g., by inserting into an HTTP connection a pop-up that checks whether a human is at the other end). In any case, mitigation largely requires the presence of a human in the loop and/or expensive equipment. In contrast, supervised machine learning allows for automatic segregation of malicious and regular traffic and, unlike the other approaches, is completely passive (i.e., does not require human intervention).

Distributed Supervised Architecture for Traffic Segregation

The techniques herein allow for separating attack and normal traffic in a DoS attack by using supervised machine learning (ML) techniques. In greater detail, a ML-based model of representative normal traffic flows is created a-priori (by using either a local or a centralized approach) and may be continuously updated based on local information. When an attack is detected, an anomaly score is computed according to such a model for each traffic flow. Flows with higher anomaly scores are removed from the flow set and attack detection is repeated based on the remaining flows only. The procedure is repeated recursively until the classifier does not activate (e.g., "fire up") any longer. The embodiments also include a mechanism for checking that the normal traffic model does not drift away from the observed traffic.

Specifically, according to one or more embodiments of the disclosure as described in detail below, data flows are received in a network, and information relating to the received data flows is provided to a machine learning attack detector. Then, in response to receiving an attack detection indication from the machine learning attack detector, a traffic segregation procedure is performed including: computing an anomaly score for each of the received data flows based on a degree of divergence from an expected traffic model, determining a subset of the received data flows that have an anomaly score that is lower than or equal to an anomaly threshold value, and providing information relating to the subset of the received data flows to the machine learning attack detector.

Illustratively, the techniques described herein may be performed by hardware, software, and/or firmware, such as in accordance with the processes 244 and 247-249, which may include computer executable instructions executed by the processor 220 (or independent processor of interfaces 210) to perform functions relating to the techniques described herein. For example, the techniques herein may be treated as extensions to conventional protocols, such as the various PLC protocols or wireless communication protocols, and as such, may be processed by similar components understood in the art that execute those protocols, accordingly.

Operationally, an attack detector, which may operate based on ML techniques, can be fed with aggregated statistics computed on data flows in the network. Also, a learning machine (LM) can be used to continuously build and train a LM-based model of normal (or "expected") traffic, which allows for computing an anomaly score for each flow (i.e., a measure of how "far" that flow is to expected traffic behavior). For example this may be performed by evaluating anomaly scores of the flows in a Detailed Records Cache (DRC) (described below) when the detector shows that no attack is in progress.

When the attack detector fires, an iterative procedure is triggered: flows can be ranked according to their anomaly score, and the aggregated statistics are recomputed after excluding from the dataset the flows whose anomaly score is lower than a given threshold. The detector is then applied to the resulting aggregated statistics, and if it does not fire any longer, it may be concluded that a good segregation between anomalous and normal traffic has been reached. Otherwise, the procedure is repeated after choosing a different threshold for the anomaly score until the convergence criterion is finally met.

Figure 4:
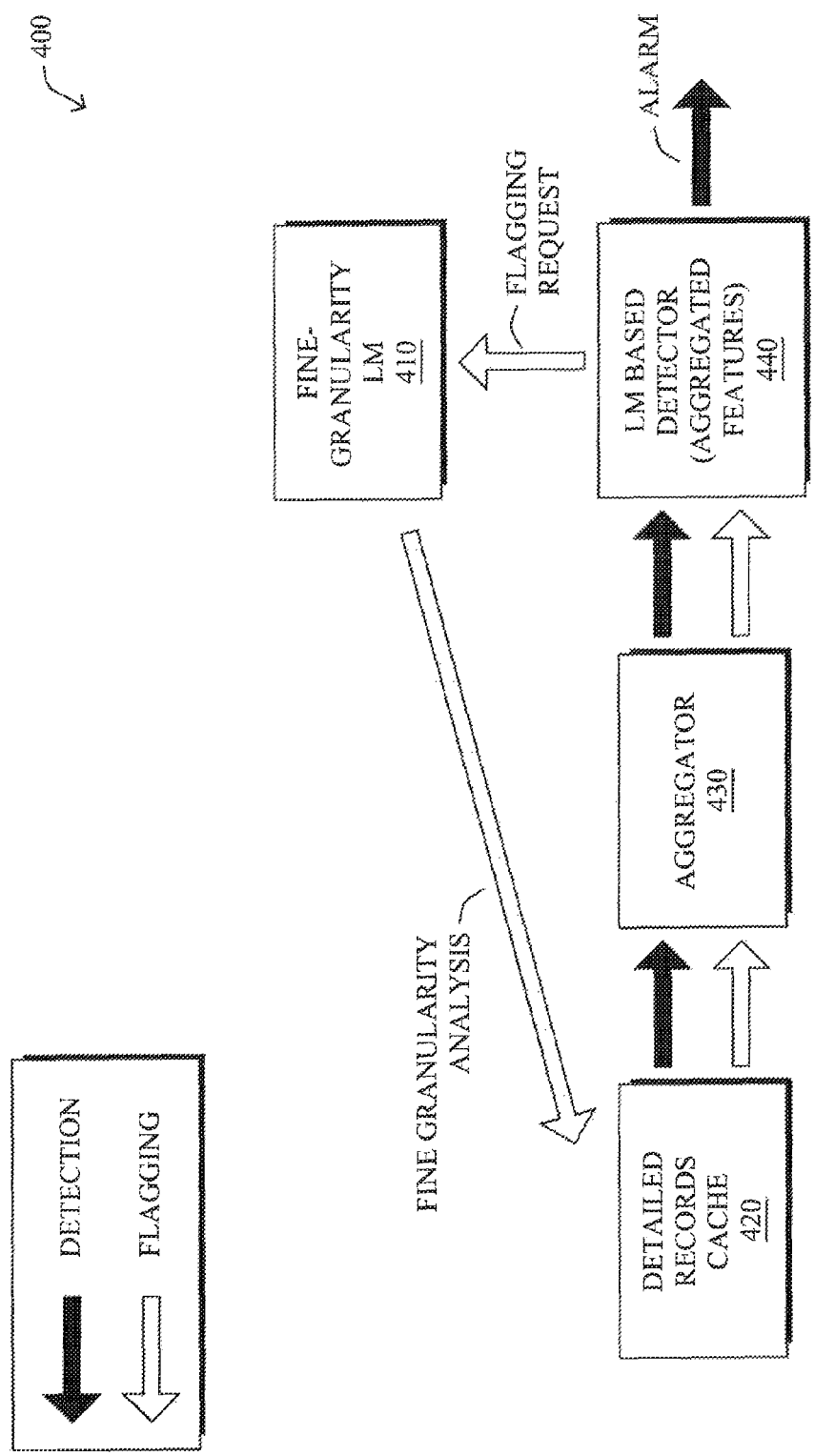
FIG. 4 illustrates an example diagrammatic representation of an attack traffic segregation system.

Referring now to FIG. 4, the system 400 takes as input a steady flow of detailed traffic records (e.g., data flows), where the system 400 may be hosted on a device such as the device 200, as shown in FIG. 2, for example. Once they are received, such records are stored in a cache whose purpose is to provide a detailed snapshot of the current traffic composition. The cache may be denoted as the Detailed Records Cache (DRC) 420 (e.g., stored within data structures 245 of device 200).

Subsequently, each record stored in the DRC 420 may be fed into the aggregator 430 that computes a vector of aggregated features for the current traffic composition. Any number of possible statistics can be used as features, including, as an example:

Average flow duration, number of packets, and bytes; and/or

Traffic proportion to be attributed to a certain application. The features can be computed using any suitable computation techniques, including, for instance, a sliding window model, binning, and the like.

Such aggregated features are then forwarded to a ML-based attack detector 440, which is configured to make a decision about whether an attack is taking place by examining the received aggregated feature vectors from the aggregator 430. Various suitable attack detection techniques may be utilized by the attack detector 440. Optionally, the detector 440 can also include a classification result that specifies the type of the detected attack. Several ML-based techniques can be used for implementing such a component, including, for example:

Classification-based techniques, such as Support Vector Machines, Maximum Likelihood classifiers, ANNs, etc.; and/or Anomaly Detection-based techniques, Once the LM-based attack detector block 440 has activated, the system 400 enters a traffic flagging state. In particular, the detection block 440 will activate another LM-based functional block (e.g., fine-granularity LM 410), which will perform a finer granularity analysis on the records accumulated in the DRC 420. As opposed to the detection block 440, which takes as input a feature vector whose components are aggregated statistics (from the aggregator 430), this LM 440 is fed with a dataset where each feature vector corresponds to a single traffic record. As a consequence, the feature space for the fine-granularity LM 410 will be different. Examples of possible features in that space include but are not limited to:

Flow duration;

Number of bytes per flow; and/or

Binary flags that specify whether the flow belongs to a well-known application (in general, each application may correspond to a separate feature).

The goal of the fine-granularity LM 410 is to segregate data flows into "attack" and "normal traffic" classes. In greater detail, the block 410, given the overall set of observed traffic flows S. will iteratively compose a subset S which causes the detection block not to activate. That is, the subset S' ideally comprises only "normal" traffic, and thus, the LM-based attack detector 440 would not fire when analyzing this subset. Once such stopping condition has been met, the traffic that is not part of the subset S' will be flagged as attack traffic.

Assuming the attack detection block 440 was an ideal detection block with perfect recall (i.e., the detector 440 would activate even if only a single attack flow was present), the optimal S' would be the largest possible subset that causes the detector 440 not to activate. On the other hand, when dealing with most real-world detectors, when a detector does not activate, it is not guaranteed that a portion of the attack traffic is not still in S'. Therefore, trade-offs may be necessary for determining an effective convergence criterion (e.g., the condition which, when satisfied, indicates that traffic segregation has occurred).

As explained above, the fine-granularity LM 410 is operable to segregate data flows into "attack" and "normal traffic" classes. In particular, the fine-granularity LM 410 may operate according to the following algorithm, where S represents the set of traffic flows the detailed records in the cache 420 are associated with, S'(n) represents the n-th element of a sequence whose elements are candidate subsets of S (such a sequence is generated by the fine-granularity LM until the convergence criterion is met), X(S' (n)) represents the vector of aggregated statistics computed by the aggregator 430 over the records in S'(n), and Y(X(S'(n))) represents the output of the detector 440 when its input is X(S'(n)):

1. Compute S'(n).
2. Provide S'(n) as input to the aggregator block 430, which will return X(S'(n)).
3. Provide X(S'(n)) to the detector block 440 which will return Y(X(S'(n)))).
4. Y(X(S'(n))) is then fed back into the fine-granularity LM 410. Then, based on its own internal convergence criterion, the fine-granularity LM 410 determines whether the best traffic segregation has been achieved (which may not necessarily correspond to the theoretically optimum solution, since some implementations of the block 410 could settle for a sub-optimal solution in order to reduce the computational requirements for the algorithm).
5. If the convergence criterion has not yet been met, the fine-granularity LM 410 will compute another candidate subset S'(n+1), and another round of computation will follow. Note that the choice of S'(n+1) may depend on the previously received feedbacks S'(i) for i in [0, n]. This reflects the fact that the output of the attack detector 440 on a candidate subset is potentially used in order to create the following candidate subset, as shown generally in FIG. 5.

Referring again to FIG. 4, an aspect of the disclosed embodiments consists in having the high granularity LM 410 learn a model of the normal traffic. In particular, the goal of supervised learning is to build a model of normal traffic at the LM 410 and to be able to assign an anomaly score to a particular flow, which specifies how "far" such a flow is from the normal traffic behavior.

A number of suitable techniques (e.g., Gaussian Mixtures, a combination of multi-variate Gaussian variables, etc.) may be utilized for building a statistical model of the regular traffic which allows for computing, for a given flow, the likelihood of it belonging to normal traffic. In this case, the inverse of the likelihood can be used as an "anomaly score." Another possible solution entails creating a cluster-based model of the normal traffic, where the distance of a flow (e.g., its associated feature vector) can be used as the anomaly score metric.

Regardless of the adopted technique, however, the high granularity LM 410 can build a model of the normal traffic based on a representative data set. In one example, the model computation can be totally local. In particular, the flows stored in the detailed records cache (DRC) 420 can be used as the training set for building the normal traffic model. In this case, the output of the LM-based detector block 440 is used in order to check that the traffic in the DRC 420 is indeed normal and that the model does not fit over anomalous data. In fact, the model would otherwise be trained to recognize anomalous behaviors as if they were normal traffic and this would make segregation impossible. However, fitting a model on a large data set can be computationally expensive, and depending on the resources available at the node hosting the classifier and the complexity of the ML techniques, such an operation may not be performed locally. Therefore, this configuration may be preferable for computationally inexpensive algorithms (e.g., a cluster-based model computed with a K-Means clustering algorithm or a Naive Bayes probabilistic model).

In another embodiment of this disclosure, a centralized entity called Model Computation Engine (MCE), which can be hosted on a high-end platform with large computational resources such as a network controller, is in charge of computing the expected traffic model for the node running the LM. In this case, an LM that has no such model available can send a model computation request to the MCE using an IP message, for example, specifying the ML algorithm which it supports and the feature set which it can provide. The MCE can reply with a model computation response, which includes a response code. The code may be negative in case that the required ML algorithm is not supported, in which case the node falls back to the local training mode or sends a model computation request specifying a different algorithm. Otherwise, if the response is positive, the node may begin sending samples of its observed traffic to the MCE using a model computation data message. Each of these messages can be explicitly acknowledged by the MCE, by specifying whether more training data are needed.

Then, when the MCE has retrieved enough training data, it can compute the model and send it to the node by using a model description message. The particular format of such a message depends on the particular LM technique. For example, the cluster may become centered in the event that cluster-based modelling is used, or it may include a set of Gaussian variables in case of a Gaussian Mixture Model. Also, if the MCE realizes that it has not enough data points for the model computation to converge, it can explicitly request more data from the node by using a model computation data request message. Optionally, the MCE can use the message in order to further request normal traffic data from multiple nodes in order to create a more general traffic model (i.e., a traffic model which covers a wider range of behaviors than those which can be observed by a single node in a particular period). In yet another embodiment, the MCE may select the set of nodes from which it requires to retrieve traffic samples that are similar (e.g., nodes that are connected to the same network).

In yet another embodiment, the expected traffic model computation can be distributed across a set of nodes in computer system 100. This allows training the model with data observed at several vantage points, thus resulting in higher generality. In particular, several techniques (such as those falling in the general class of data stream clustering) allow incremental training of a model. In particular, the model can be trained independently on separated datasets with no need to have all of the training data available at the same time. In this instance, the node initiating the model training can first perform a round of model computation based on its locally available data, then send a Distributed Model Computation Request to one or more peer nodes. Such request can include: an indication of the particular chosen algorithm and/or the current state of the computed model (i.e., the result of model fitting over the node's local data). A node receiving the Distributed Model Computation Request performs model fitting based on the intermediate results carried in the message and the data in its own internal data set. Once the model computation has converged, a Distributed Model Computation Response can be sent back to the node initiating the computation. The procedure may be repeated with a set of different peer nodes until an exhaustive model has been computed.

In order to choose which peer nodes to send the Distributed Model Computation Request to, instead of the NICE, a Model Computation Coordinator (MCC) can be utilized. Such a central entity does not perform ML processing directly, but rather keeps a directory listing of the nodes which can participate in the model creation and their supported algorithms. Such component can also be interfaced with a Policy Engine. As an alternative, all nodes that are available for performing distributed computation can subscribe to a special multicast group using a multicast IP protocol, such as protocol-independent-multicast source-specific-multicast (PIM SSM), in which case the nodes traversed by traffic with similar traffic patterns may register to the same multicast group.

It should be understood that the above approaches for building the expected traffic model are merely for demonstration only, as any suitable traffic building algorithm may be utilized. Further, those procedures can be repeated multiple times for building different kinds of traffic models. Once several traffic models become available in the network, a node can choose which one is the best fit for modelling its own observed traffic. In particular, given a set of computed models, the node can apply each of the models for computing an anomaly score of the flows in its own network space (or a subset thereof). When using multiple expected traffic models, the model issuing the lowest average anomaly score may be chosen, as the lower the anomaly score, the better the model is at explaining the variation in the normal traffic. (Note that in this case, in order to avoid over-fitting, the available data may be split into a training set and a validation set, as recommended by ML best-practices.) Also, a minimal acceptable anomaly score can be specified beforehand, where if none of the models re able to fulfill the minimum score requirement, model computation is triggered again.

Figure 5:
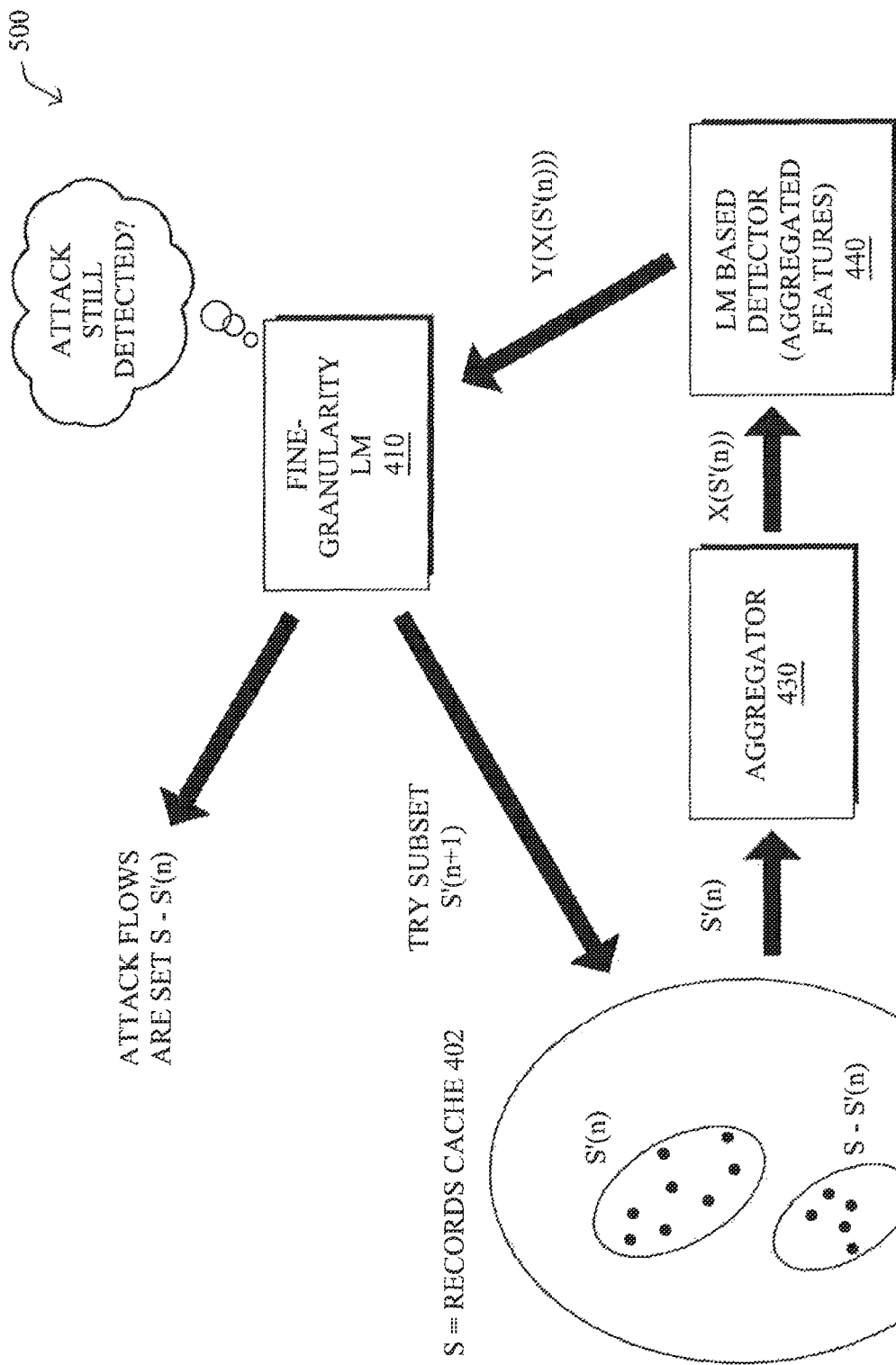
FIG. 5 illustrates an example diagrammatic representation of a traffic segregation procedure.

Referring now to FIG. 5, assuming that an expected traffic model M has been computed using any of the above techniques, for example, and the model M is now available in the network, another aspect of this disclosure consists in a supervised technique that can be used for creating a series S'(n) of candidate expected traffic flows. In particular, for the purposes of the present disclosure, A(X, M) is defined as the anomaly score of data flow X according to the traffic model M. In this case, and as further described above, the following algorithm may apply:

1. Begin with a high anomaly score threshold Amax(n).
2. Create the candidate flows set S'(n)={X/A(X, M)<Amax(n)}.
3. Feed Y(X(S'(n))), which represents the output of the detector 440 when its input is aggregated features X(S'(n)), back into the fine-granularity LM 410. This will allow the LM to check whether convergence (e.g., segregation of normal and attack traffic) has been reached. The basic idea is that convergence is reached when S'(n) is the largest possible traffic subset that causes the attack detector 440 not to fire. However, different variations of this technique can converge to different sub-optimal solutions.
4. If convergence has not been reached, choose a new threshold value such that Amax(n+1)<Amax(n), and iterate again.

Figure 6:
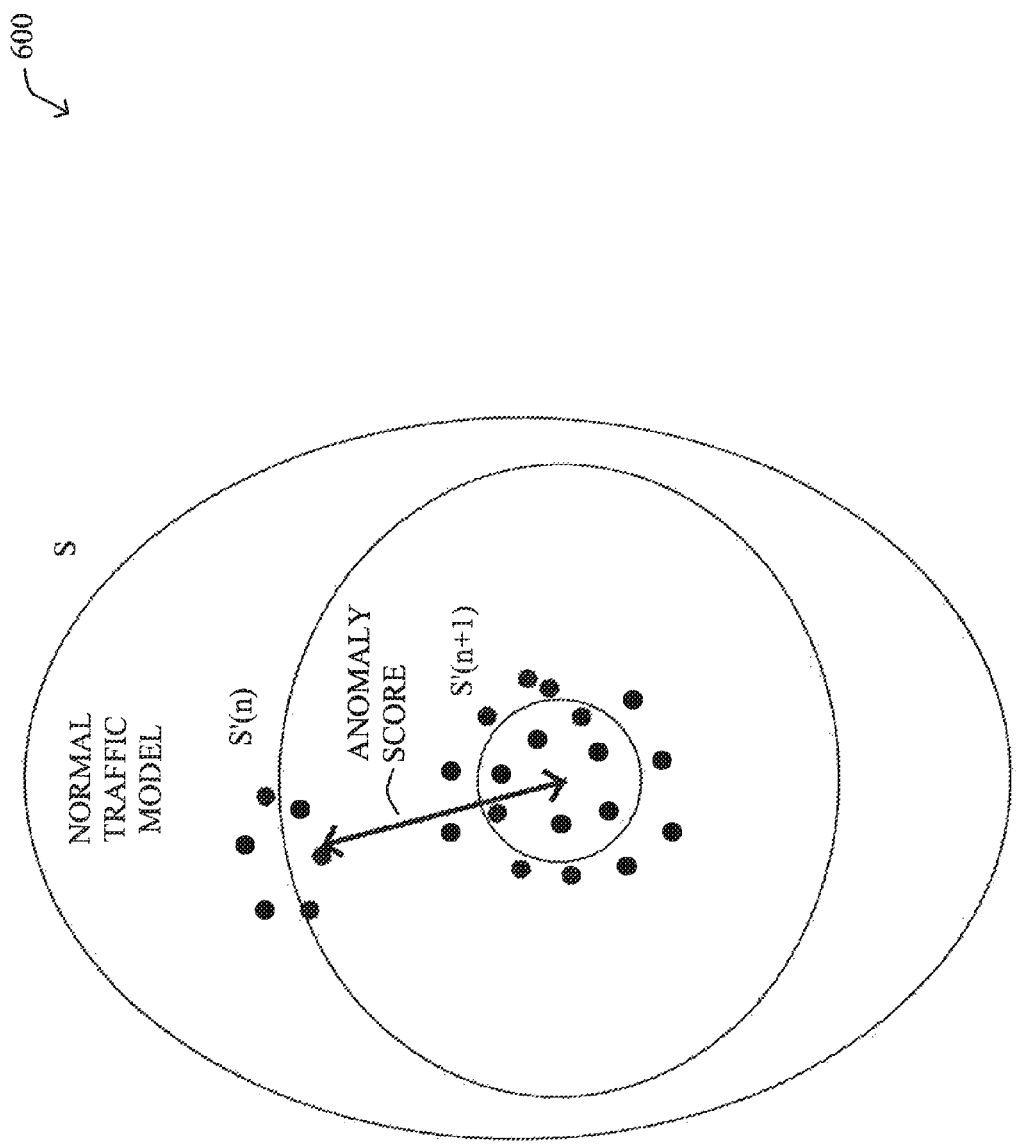
FIG. 6 illustrates an example graphical representation of convergence in the attack traffic segregation system.

In other words, the above algorithm (e.g., traffic segregation procedure) consists in removing from the candidate S' all of the flows whose anomaly score according to the normal traffic model is higher than a given threshold and checking whether, by removing those flows, the remaining traffic is detected as normal, as shown generally in FIG. 6.

When setting the threshold for the anomaly score (e.g., anomaly threshold value), various approaches are available. For example, a simple solution involves sorting all of the available flows by their respective anomaly score and then removing them one at a time from S until the attack is no longer detected (i.e., Amax(n) simply equals the anomaly score of the n-th flow in the decreasingly ordered sequence). In the case of an ideal classifier, this method is assured to converge to an optimal solution; however, it may be less scalable in certain circumstances, as it entails one round of feature computation and classifier evaluation for every flow or classes of flows.

Though, this may be alleviated by using a batch approach and removing from S the N flows with highest anomaly scores for each iteration. This may not guarantee convergence to an optimal solution; however, the solution yield by this technique can be refined. To this end, once a flow set S has been found such that the detector does not activate, the flows which have been removed can be added back to S (in this case they will be sorted by increasing anomaly score) until the classifier fires up again.

In another scenario, a threshold may be chosen a-priori (e.g., select all of the samples whose probability with respect to the model is less than 99%, then 98%, and so forth). This approach may involve less iterations, and the choice of a reasonable sequence of thresholds is flexible. For example, when using a statistical model of the normal traffic and the associated likelihood for computing the anomaly score, if the statistical model has a large variance, the probability of each point in the normal-traffic region of the feature space may indeed be very low (i.e., the likely points are spread in a very vast region). Therefore, the probability threshold cannot be set to an absolute value, but rather depends on the particular distribution modelling the normal traffic. A similar example can be may be implemented in case of a cluster-based model.

A percentile-based approach can also be adopted. In particular, once an attack is detected, for each of the points in the flow cache 420, the corresponding anomaly score according to the expected traffic model can be computed. Once the set of the anomaly scores for each point is available, the x-percentile of such set is computed (i.e., an anomaly score such that x-percent of the samples are smaller). This value can be used as an anomaly threshold value for separating samples that can be attributed to the normal traffic class from the attack samples. If such threshold does not allow the algorithm to converge (i.e., when the detector is applied to the segregated traffic, it still fires up), a new threshold can be computed based on a different y-percentile such that x>y.

Figure 7:
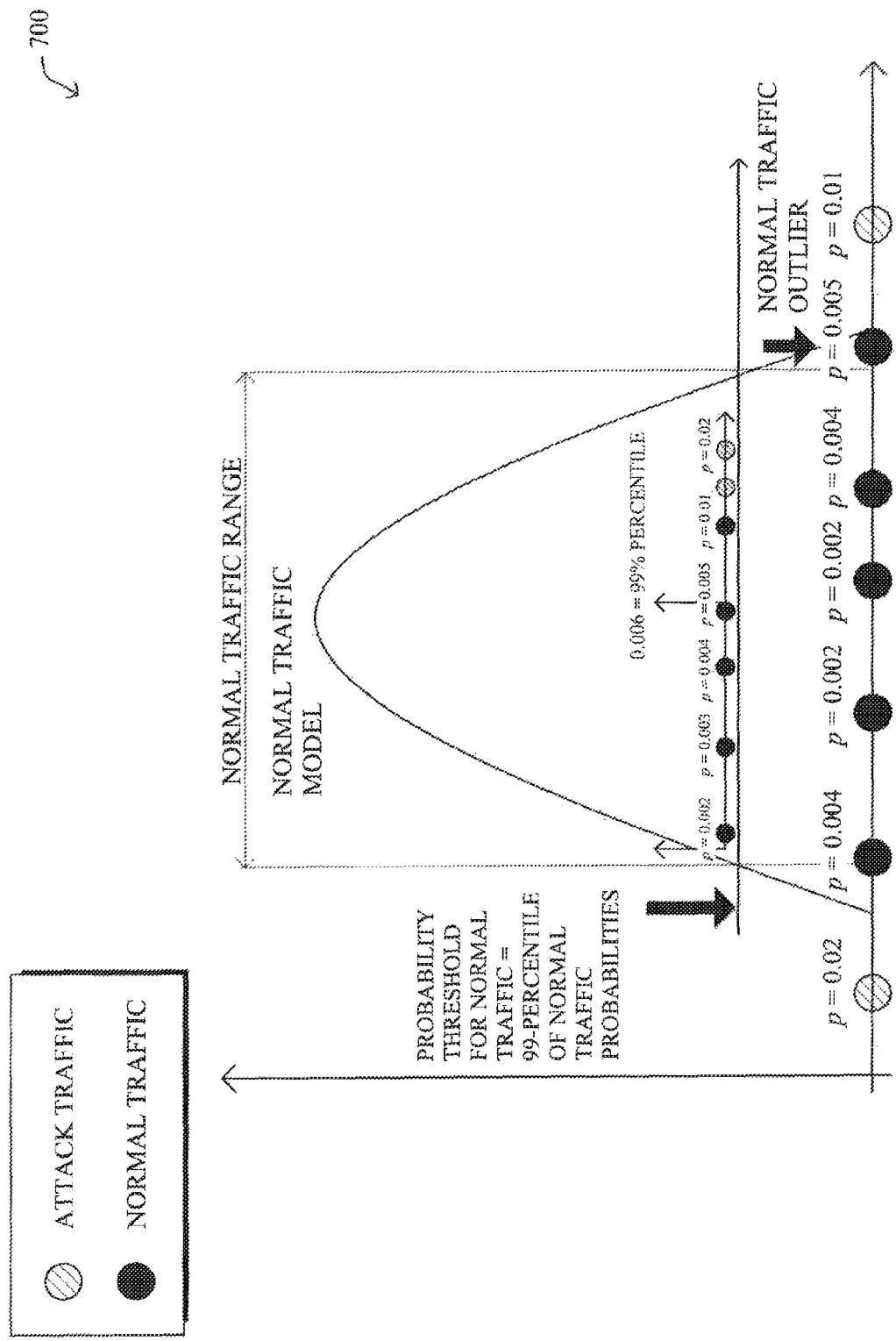
FIG. 7 illustrates an example statistical representation of an expected traffic model fit over a set of available normal traffic data points.

Referring now to FIG. 7, a probability-based model is shown, where a set of feature vectors is attributed to the normal traffic class, a probability model is fit onto the normal data set. When an attack is detected by the LM-based attack detector 430, the probability of each flow corresponding to normal traffic according to the appropriate expected traffic model is computed. The 99-percentile of such probability values is then computed and used as the threshold value for discriminating between normal and attack traffic.

To this end, FIG. 7 shows a simplified scenario where only one feature is used for flagging, and a statistical expected traffic model is fit over a set of available normal traffic data points. Subsequently, the model is used for associating a score with each of the data points (in this case, this is the inverse of the probability of that point according to the model). Then, the 99-percentile of such anomaly scores is computed. Illustratively, as shown in FIG. 7, 99% of the data points have an associated score which is lower than 0.06. Such value is used as an anomaly threshold value for separating attack traffic from normal traffic. As it happens, this can cause potential misclassification of some flows, which can be corrected by other means.

In yet another embodiment, the percentile-based approach can be used for quickly reaching a sub-optimal segregation. After that point has been reached, flows can be added back until the classifier fires up, similar to the batch-based approach described above.

Another aspect of this disclosure involves checking that the computed expected traffic model still, in fact, reflects the actual composition of the normal traffic. In greater detail, since the fine-granularity LM 410 is only invoked when an attack is detected, statistical drifts in the normal traffic behavior may go unnoticed (i.e., the model may become unaligned with the current normal traffic behavior). In order to avoid such a detrimental effect, the installed expected traffic model can be periodically checked. In particular, at regular time intervals, the fine-granularity LM 410 may be invoked on the flows in the DRC 420 when the attack detector 430 shows that no attack is taking place. An anomaly score for each flow can be computed according to the expected traffic model, where if the average score is too high, the node assumes that the model no longer reflects with adequate accuracy the characteristics of the normal traffic, and thus a new model computation is triggered.

Figure 8:
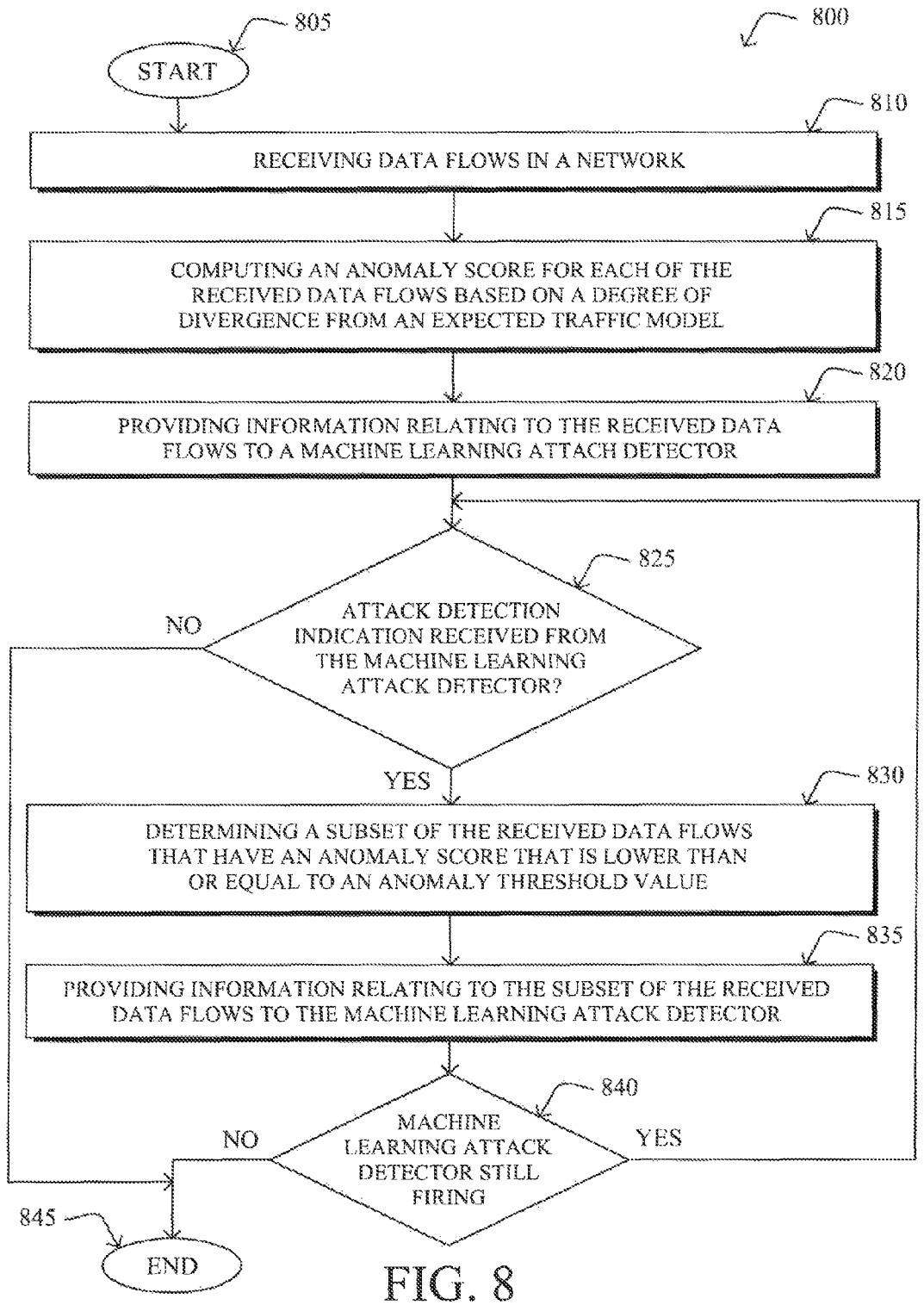
FIG. 8 illustrates an example simplified procedure for a distributed supervised architecture for traffic segregation under attack.

FIG. 8 illustrates an example simplified procedure for a distributed supervised architecture for traffic segregation under attack in accordance with one or more embodiments described herein. The procedure 800 may start at step 805, and continues to step 810, where, as described in greater detail above, a device in a network (e.g., any of controllers/servers 102 or nodes/devices 104 shown in FIG. 1) may receive information regarding traffic flows in the network.

At step 815, the device may provide information relating to the received data to a machine learning attack detector, such as the LM-based attack detector 430. Aggregated statistics of the data flows may be calculated by the aggregator 420 and forwarded from the aggregator 420 to the LM-based attack detector.

At step 820, it is determined whether an attack detection indication has been received from the machine learning attack detector. The LM-based attack detector 430 may "fire" (e.g., provide an attack detection indication) when an attack is detected based on the received aggregated statistics from the aggregator 420. In response to the attack detection indication, the fine-granularity LM 410 may initiate a traffic segregation procedure, where the attack traffic is iteratively segregated from normal traffic, based on the expected traffic model.

The traffic segregation procedure may include, at least, steps 825, 830, and 835, where at step 825, the device computes an anomaly score for each of the received data flows based on a degree of divergence from an expected traffic model. As explained above, the anomaly score computations may be performed by the fine-granularity LM 410, as shown in FIG. 4. The expected traffic model may be computed built using the flows stored in the detailed records cache (DRC) 420 as the training set. Also, the Model Computation Engine (MCE), which can be hosted on a high-end platform with large computational resources such a network controller, may be in charge of computing the expected traffic model. In addition in step 830, a subset of the received data flows that have an anomaly score that is lower than or equal to an anomaly threshold value is determined, and information relating to the subset of the received data flows is provided to the machine learning attack detector in step 835. This procedure may be performed by the fine-granularity LM 410 until sufficient convergence occurs (i.e., segregation of the attack traffic from the normal traffic). Sufficient convergence may coincide with the LM-based attack detector 430 no longer firing (i.e., no longer indicating that an attack has been detected) based on the data flows provided to the detector 430, as shown at step 840.

The procedure illustrative ends at step 845. The techniques by which the steps of procedure 800 may be performed, as well as ancillary procedures and parameters, are described in detail above.

It should be noted that the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. For example, though computation of the anomaly score in step 825 is shown within the traffic segregation procedure (in response to attack detection), the anomaly score may be computed without requiring a detected attack, such as for management, measurement, statistics, etc.

The techniques described herein, therefore, allow for passive (i.e., without human intervention) traffic segregation. In addition, the disclosed embodiments can be highly distributed and do not need to be installed on major chokepoints. Moreover, the embodiments allow for a local-only training of the traffic flagging block.

While there have been shown and described illustrative embodiments that provide for a distributed supervised architecture for traffic segregation under attack, it is to be understood that various other adaptations and modifications may be made within the spirit and scope of the embodiments herein. For example, while the techniques herein are described primarily with respect to normal-attack traffic segregation, as well as building normal traffic models, the techniques herein may also be adapted for use with other traffic segregation mechanisms and traffic modeling algorithms that are not related to attack detection. In addition, while certain networks and topologies are described herein, the techniques may be applied more generally to any form of computer network.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device in a network, data flows in a network;
   providing information relating to the received data flows to a machine learning attack detector that is configured to generate an attack detection indication by analyzing the provided information; and
   in response to receiving the attack detection indication from the machine learning attack detector, performing a traffic segregation procedure to segregate normal traffic flows in the received data flows from attack traffic flows, the traffic segregation procedure including:
   setting the anomaly threshold value to an initial value,
   computing an anomaly score for each of the received data flows, the anomaly score computed for each received data flow based on a degree of divergence between the data flows and an expected traffic model,
   determining a subset of the received data flows that have an anomaly score that is lower than or equal to an anomaly threshold value,
   providing information relating to the subset of the received data flows to the machine learning attack detector,
   performing the traffic segregation procedure on the subset of received data flows until an attack is no longer detected by the machine learning attack detector in the subset of received data flows provided to the machine learning attack detector, and
   iteratively decreasing the anomaly threshold value in response to each subsequent attack detection indication.

2. The method as in claim 1, further comprising:
   flagging one or more data flows that have an anomaly score that is greater than the anomaly threshold value as attack traffic.

3. The method as in claim 1, wherein the traffic segregation procedure further includes:
   sorting the data flows according to their respective anomaly score; and
   setting the anomaly threshold value such that exactly a predetermined number of data flows exceed the anomaly threshold value in response to the attack detection indication.

4. The method as in claim 1, wherein the traffic segregation procedure further includes:
setting the anomaly threshold value such that a predetermined percentage of data flows exceed the anomaly threshold value in response to the attack detection indication.

5. The method as in claim 1, further comprising:
receiving the expected traffic model from a centralized entity in the network.

6. The method as in claim 1, further comprising:
generating the expected traffic model based on the received data flows.

7. The method as in claim 1, further comprising:
determining whether the expected traffic model continues to be representative of normal traffic in the network.

8. The method as in claim 1, further comprising:
receiving, from the machine learning attack detector, an indication of a type of detected attack that triggered the attack detection indication.

9. The method as in claim 1, wherein the information relating to the received data flows includes aggregated statistics generated based on the received data flows.

10. The method as in claim 9, wherein the aggregated statistics represent at least one of an average data flow duration or a proportion of data flows attributed to a particular application.

11. An apparatus, comprising:
one or more network interfaces to communicate with a network;
a processor coupled to the one or more network interfaces and configured to execute a process; and
a memory configured to store program instructions which include the process executable by the processor, the process comprising:
receiving, at a device in a network, data flows in a network;
providing information relating to the received data flows to a machine learning attack detector that is configured to generate an attack detection indication by analyzing the provided information; and
in response to receiving the attack detection indication from the machine learning attack detector, performing a traffic segregation procedure to segregate normal traffic flows in the received data flows from attack traffic flows, the traffic segregation procedure including:
setting the anomaly threshold value to an initial value,
computing an anomaly score for each of the received data flows, the anomaly score computed for each received data flow based on a degree of divergence between the data flows and an expected traffic model,
determining a subset of the received data flows that have an anomaly score that is lower than or equal to an anomaly threshold value,
providing information relating to the subset of the received data flows to the machine learning attack detector,
performing the traffic segregation procedure on the subset of received data flows until an attack is no longer detected by the machine learning attack detector in the subset of received data flows provided to the machine learning attack detector, and
iteratively decreasing the anomaly threshold value in response to each subsequent attack detection indication.

12. The apparatus as in claim 11, wherein the process further comprises:
flagging one or more data flows that have an anomaly score that is greater than the anomaly threshold value as attack traffic.

13. The apparatus as in claim 11, wherein the traffic segregation procedure further includes:
sorting the data flows according to their respective anomaly score; and
setting the anomaly threshold value such that exactly a predetermined number of data flows exceed the anomaly threshold value in response to the attack detection indication.

14. The apparatus as in claim 11, wherein the traffic segregation procedure further includes:
setting the anomaly threshold value such that a predetermined percentage of data flows exceed the anomaly threshold value in response to the attack detection indication.

15. The apparatus as in claim 11, wherein the process further comprises:
receiving the expected traffic model from a centralized entity in the network.

16. The apparatus as in claim 11, wherein the process further comprises:
generating the expected traffic model based on the received data flows.

17. The apparatus as in claim 11, wherein the process further comprises:
determining whether the expected traffic model continues to be representative of normal traffic in the network.

18. The apparatus as in claim 11, wherein the process further comprises:
receiving, from the machine learning attack detector, an indication of a type of detected attack that triggered the attack detection indication.

19. The apparatus as in claim 11, wherein the information relating to the received data flows includes aggregated statistics generated based on the received data flows.

20. The apparatus as in claim 19, wherein the aggregated statistics represent at least one of an average data flow duration or a proportion of data flows attributed to a particular application.

21. A tangible non-transitory computer readable medium storing program instructions that cause a computer to execute a process, the process comprising:
receiving data flows in a network;
providing information relating to the received data flows to a machine learning attack detector; and
in response to receiving an attack detection indication from the machine learning attack detector, performing a traffic segregation procedure to segregate normal traffic flows in the received data flows from attack traffic flows, the traffic segregation procedure including:
setting the anomaly threshold value to an initial value,
computing an anomaly score for each of the received data flows, the anomaly score computed for each received data flow based on a degree of divergence from an expected traffic model,
a subset of the received data flows that have an anomaly score that is lower than or equal to an anomaly threshold value,
providing information relating to the subset of the received data flows to the machine learning attack detector, performing the traffic segregation procedure on the subset of received data flows until an attack is no longer detected by the machine learning attack detector in the subset of received data flows provided to the machine learning attack detector, and
iteratively decreasing the anomaly threshold value in response to each subsequent attack detection indication.

* * * * *

UNITED STATES PATENT AND TRADEMARK OFFICE
CERTIFICATE OF CORRECTION

PATENT NO. : 9,635,050 B2
APPLICATION NO. : 14/338526
DATED : April 25, 2017
INVENTOR(S) : Andrea Di Pietro et al.

Page 1 of 1

It is certified that error appears in the above-identified patent and that said Letters Patent is hereby corrected as shown below:

On the Title Page

In the Abstract, item (57), please amend as shown:
In one embodiment, data flows are received in a network, and information relating to the received data flows is provided to a machine learning attack detector. Then, in response to receiving an attack detection indication from the machine learning attack detector, a traffic segregation procedure is performed including: computing an anomaly score for each of the received data flows based on a degree of divergence from an expected traffic model, determining a subset of the received data flows that have an anomaly score that is lower than or equal to an anomaly threshold value, and providing information relating to the subset of the received data flows to the machine learning attack detector.

In the Specification

Column 12, Line 25, please amend as shown:
uted Model Computation Request to, instead of MCE, a Signed and Sealed this
Thirtieth Day of April, 2019

Andrei Iancu
*Director of the United States Patent and Trademark Office*

UNITED STATES PATENT AND TRADEMARK OFFICE
CERTIFICATE OF CORRECTION

PATENT NO. : 9,635,050 B2  
APPLICATION NO. : 14/338526  
DATED : April 25, 2017  
INVENTOR(S) : Andrea Di Pietro et al.

Page 1 of 1

It is certified that error appears in the above-identified patent and that said Letters Patent is hereby corrected as shown below:

In the Specification

In Column 12, Line 25, please amend as shown:  
uted Model Computation Request to, instead of the MCE, a This certificate supersedes the Certificate of Correction issued April 30, 2019.

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*